(12) United States Patent
Iyama (10) Patent No.: US 7,760,444 B2
(45) Date of Patent: Jul. 20, 2010

(54) IMAGING OPTICAL SYSTEM AND IMAGE PICKUP APPARATUS USING THE SAME

(75) Inventor: Noriyuki Iyama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 91 days.

(21) Appl. No.: 12/215,252

(22) Filed: Jun. 25, 2008

(65) Prior Publication Data

US 2009/0052053 A1    Feb. 26, 2009

(30) Foreign Application Priority Data

Jul. 4, 2007    (JP) .............................. 2007-175798

(51) Int. Cl.
  G02B 13/04    (2006.01)
  G02B 9/34    (2006.01)
  H04N 5/225    (2006.01)
(52) U.S. Cl. .................. 359/749; 359/781; 348/335
(58) Field of Classification Search ................ 348/335, 348/340; 359/715, 749, 753, 781
See application file for complete search history.

(56) References Cited

U.S. PATENT DOCUMENTS 6,757,109 B2 * 6/2004 Bos ............................ 359/753
6,762,890 B2 * 7/2004 Sato et al. .................... 359/771

FOREIGN PATENT DOCUMENTS

JP    2003-307671    10/2003
JP    3756114    1/2006

OTHER PUBLICATIONS

The Photonics Dictionary 1999, p. D-42, Lauren Publishing (1999).

* cited by examiner

Primary Examiner—David N Spector
(74) Attorney, Agent, or Firm—Kenyon & Kenyon LLP (57) ABSTRACT

An imaging optical system includes in order from an object side thereof: a front lens unit having a negative refracting power, an aperture stop, and a rear lens unit having a positive refracting power. The front lens unit includes in order from the object side, a first lens having a negative refracting power. The rear lens unit includes in order from the object side, a second lens which is a positive lens, a third lens which is a negative lens, and a fourth lens which is a positive lens. The imaging optical system satisfies conditional expressions (1) and (2): $1.6 < |f_{G1}|/F_A < 5$ ... (1); $1.2 < f_{G2}/F_A < 5$ ... (2); where $F_A$ denotes a focal length of the overall imaging optical system, $f_{G1}$ denotes a focal length of the front lens unit, and $f_{G2}$ denotes a focal length of the rear lens unit.

13 Claims, 7 Drawing Sheets

IMAGING OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2007-175798 filed on Jul. 4, 2007; the entire content of which are incorporated herein by reference.

BACKGROUND OF THE INVENTION

1. Field of the Invention

The present invention relates to an imaging optical system, and an image pickup apparatus using the same, and particularly to an image pickup apparatus in which a solid image pickup element such as a CCD (Charge Coupled Device) and a CMOS (Complementary Metal Oxide Semiconductor) is used.

2. Description of the Related Art

As an image pickup apparatus in which an image pickup element (e.g., CCD and CMOS) and an imaging optical system are used, a car-mounted camera is known. Moreover, in the recent years, automobiles provided with a car-mounted camera are becoming popular. The conventional car-mounted cameras were being used mainly as a visual monitor. Recently, the car-mounted camera has been used as a camera for a higher level sensor, such as a sensor for a white line detection and monitoring of traffic line deviation, an obstacle detection, and driver monitoring. An imaging optical system used in these image pickup apparatuses is sought to be an imaging optical system having a small F number to enable imaging of a favorable quality image even at night, and which is bright and capable of securing an image angle.

As examples of an imaging optical system in which number of lenses forming the lens system is small, the image angle is wide, and the F number is comparatively bright, and in which a back focus and a telecentricity suitable for an image pickup apparatus is secured, an imaging optical system described in Japanese Patent Application Laid-open Publication No. 2003-307671, and an imaging optical system described in Japanese Patent No. 3756114 are known.

The optical system described in Japanese Patent Application Laid-open Publication No. 2003-307671 has a half-image angle of 30° which is comparatively wide, and the F number of 2.8. Moreover, the optical system described in Japanese Patent No. 3756114 has the half-image angle of 30° which is comparatively wide, and the F number of about 3.5.

SUMMARY OF THE INVENTION

According to one aspect of the present invention, an imaging optical system according to the present invention includes in order from an object side thereof:

a front lens unit having a negative refracting power, an aperture stop, and a rear lens unit having a positive refracting power, the front lens unit having a negative refracting power includes in order from the object side, a first lens having a negative refracting power, the rear lens unit having a positive refracting power includes in order from the object side, a second lens which is a positive lens, a third lens which is a negative lens, and a fourth lens which is a positive lens, and the imaging optical system satisfies the following conditional expressions (1) and (2):

$$1.6 < |f_{G1}|/F_A < 5 \quad (1)$$

$$1.2 < f_{G2}/F_A < 5 \quad (2)$$

where, $F_A$ denotes a focal length of the entire imaging optical system, $f_{G1}$ denotes a focal length of the front lens unit having a negative refracting power, and $f_{G2}$ denotes a focal length of the rear lens unit having a positive refracting power.

According to another aspect of the present invention, an image pickup apparatus which picks up an image of an object by an image pickup element includes the above-mentioned imaging optical system as an imaging optical system for imaging the object on the image pickup element.

DETAILED DESCRIPTION OF THE INVENTION

According to a first aspect of the present invention, an imaging optical system of the present invention includes in order from an object side thereof:

a front lens unit having a negative refracting power, an aperture stop, and a rear lens unit having a positive refracting power, the front lens unit having a negative refracting power includes in order from the object side, a first lens having a negative refracting power, the rear lens unit having a positive refracting power includes in order from the object side, a second lens which is a positive lens, a third lens which is a negative lens, and a fourth lens which is a positive lens, and the imaging optical system satisfies the following conditional expressions (1) and (2)

$$1.6 < |f_{G1}|/F_A < 5 \quad (1)$$

$$1.2 < f_{G2}/F_A < 5 \quad (2)$$

where, $F_A$ denotes a focal length of the entire imaging optical system, $f_{G1}$ denotes a focal length of the front lens unit having a negative refracting power, and $f_{G2}$ denotes a focal length of the rear lens unit having a positive refracting power.

Moreover, it is preferable that the first aspect of the present invention satisfies at least one of the following arrangements. It is preferable that a surface on an image side of the fourth lens is an aspheric surface, toward an area surrounding the aspheric surface on the image side, the aspheric surface has a shape such that the positive refracting power becomes weak, and the fourth lens satisfies the following conditional expression (3):

$$0.5 < |R_{4O}|/|R_{4I}| < 1.6 \quad (3)$$

where, $R_{4O}$ denotes a paraxial radius of curvature of a surface on the object side, of the fourth lens, and $R_{4I}$ denotes a paraxial radius of curvature of a surface on an image side, of the fourth lens.

Moreover, it is preferable that a surface on the image side of the fourth lens has a shape such that it has a negative refracting power at an area nearest to an effective aperture.

Moreover, it is preferable that the imaging optical system satisfies the following conditional expressions (4) and (5):

$$0.55 < d_{L2}/F_A < 1.2 \quad (4)$$

$$0.4 < d_{L4}/F_A < 1.5 \quad (5)$$

where, $F_A$ is a focal length of the overall imaging optical system, $d_{L2}$ is a thickness on an optical axis of the second lens, and $d_{L4}$ is a thickness on an optical axis of the fourth lens.

Moreover, it is preferable that the imaging optical system satisfies the following conditional expression (6):

$$65 < v_{L1} < 100 \quad (6)$$

where, $v_{L1}$ denotes an Abbe's number for the first lens.

In the imaging optical system according to the present invention, it is preferable that the first lens, the second lens, the third lens, and the fourth lens are made of glass.

To achieve a second objective, according to a second aspect of the present invention, an imaging optical system includes in order from an object side thereof:

a front lens unit having a negative refracting power, and
a rear lens unit having a positive refracting power,
the first lens unit having a negative refracting power includes in order from the object side, a first lens having a negative refracting power, the rear lens unit having a positive refracting power includes in order from the object side, a second lens which is a positive lens, a third lens which is a negative lens, and a fourth lens which is a positive lens, and an aperture stop which determines an F number is provided between the front lens unit and the rear lens unit, and the F number is 1.8 or less.

It is preferable that the imaging optical system according to the first and the second aspects of the present invention described above satisfies at least one of the following arrangements.

It is preferable that the first lens is a negative meniscus lens having a convex surface directed toward the object side.

Moreover, it is preferable that each of the second lens, the third lens, and the fourth lens constituting the rear lens unit having a positive refracting power is a single lens, and the second lens is a biconvex lens, the third lens is a biconcave lens, and the fourth lens is a biconvex lens.

Moreover, it is preferable that the image pickup apparatus which picks up an image of an object by an image pickup element includes an imaging optical system described above, as an imaging optical system for imaging the object on the image pickup element.

Moreover, it is preferable that a plurality of aspects of the present invention is satisfied simultaneously. Regarding each conditional expression presented in this specification, only an upper limit value or a lower limit value of a numerical range of further restricted conditional expression may be restricted. Moreover, various arrangements described above may be combined.

According to the present invention, it is possible to provide an imaging optical system which is advantageous for securing a back focus, a telecentricity, and an image angle, and advantageous for securing an image quality even when an F number is small. Furthermore, it is possible to provide an image pickup apparatus which includes such imaging optical system.

Prior to the description of embodiments, principles and effects of the present invention will be described below. Generally, in a wide angle optical system, a retro-focus type, which includes in order from an object side thereof a front lens unit having a negative refracting power and a rear lens unit having a positive refracting power, is used. By arranging in such manner, it is possible to secure the back focus to a certain extent, and it becomes easy to dispose a low-pass filter and an infra-red rays cutting filter between an optical system and an imager. Moreover, it is possible to make a position of an exit pupil far, and to let it be a telecentric optical system. Therefore, it is possible to let main light rays to be incident at an angle almost perpendicular with respect to the imager. Consequently, it is advantageous for a so-called 'shooting'.

For making the back focus long, it is preferable to make strong the refracting power by shortening the focal length of the front lens unit having a negative refracting power. However, with the strengthening of the refracting power of the front lens unit having a negative refracting power, distortion and chromatic aberration of magnification which occur at the front lens unit having a negative refracting power are increased.

Moreover, for reducing a size by shortening a total length of the optical system, it is preferable to make strong the refracting power by making small the focal length of the rear lens unit having a positive refracting power. However, with the strengthening of the refracting power of the front lens unit having a positive refracting power, spherical aberration and coma aberration which occur at the rear lens unit having a positive refracting power become substantial.

Moreover, for structuring a bright optical system having a small F number, it is necessary to make large a diameter near an aperture stop. At this time, the height of marginal light rays on an optical axis becomes high. Here, when the refracting power of each lens unit is strong, increase of aberration, particularly the spherical aberration and the coma aberration which occur at that surface, becomes remarkable. Particularly, in the case of making the optical system small, as it has been mentioned above, it is necessary to make strong the positive refracting power by shortening the focal length of the rear lens unit having a positive refracting power. However, as the refracting power becomes strong, a substantial negative spherical aberration occurs. Accordingly, due to the deterioration of an imaging performance, it is not possible to make the refracting power much stronger.

Therefore, the imaging optical system of the present invention provides a basic structure which includes, in order from an object side thereof, a front lens unit having a negative refracting power, an aperture stop, and a rear lens unit having a positive refracting power, and the front lens unit having a negative refracting power includes in order from the object side, a first lens having a negative refracting power, and a rear lens unit having a positive refracting power includes, in order from the object side, a second lens which is a positive lens, a third lens which is negative lens, and a fourth lens which is a positive lens.

The imaging optical system of the present invention collects by the rear lens unit having a positive refracting power an axial light beam which is diverged upon passing through the front lens unit having a negative refracting power. At this time, larger the degree to which the axial rays is converged by the rear lens unit having a positive refracting power, the more advantageous it is for widening of an angle of field.

Moreover, the present invention is characterized by satisfying the conditional expressions (1) and (2) shown below. As it has been mentioned above, for making the back focus long, it is preferable to increase the refracting power by shortening the focal length of the front lens unit having a negative refracting power. However, with the strengthening of the refracting power of the front lens unit having a negative refracting power, the distortion and the chromatic aberration of magnification which occur at the front lens unit having a negative refracting power are increased. Therefore, it is preferable to have an appropriate ratio of the focal length of the front lens unit having a negative refracting power with respect to the focal length of the overall optical system.

Moreover, for reducing the size by shortening the overall length of the optical system, it is preferable to increase the refracting power by reducing the focal length of the rear lens unit having a positive refracting power. However, with the strengthening of the refracting power of the rear lens unit having a positive refracting power, the spherical aberration and the coma aberration which occur at the rear lens unit having a positive refracting power become substantial. Therefore, it is preferable to have an appropriate ratio of the focal length of the rear lens unit having a positive refracting power with respect to the focal length of the overall optical system, as shown by expressions (1) and (2) below:

$$1.6 < |f_{G1}|/F_A < 5 \quad (1)$$

$$1.2 < f_{G2}/F_A < 5 \quad (2)$$

where, $F_A$ denotes a focal length of the overall imaging optical system, $f_{G1}$ denotes a focal length of the front lens unit having a negative refracting power, and $f_{G2}$ denotes a focal length of the rear lens unit having a positive refracting power.

By making an arrangement such that a value is lower than a lower limit value in conditional expression (1), it becomes easy to suppress an occurrence of a negative distortion. By making an arrangement such that a value is not higher than an upper limit value in conditional expression (1), it is advantageous for securing the back focus. By making an arrangement such that a value is not lower than a lower limit value in conditional expression (2), it becomes easy to suppress an occurrence of a negative spherical aberration. By making an arrangement such that a value is not higher than an upper limit value in conditional expression (2), it is advantageous for reducing the size of the optical system.

Here, it is more preferable that the conditional expression (1) is further refined as expression (1') below:

$$1.7 < |f_{G1}|/F_A < 3.5 \quad (1'), \text{ and}$$

the imaging optical system is configured to satisfy conditional expression (1').

Furthermore, it is even more preferable that the conditional expression (1) is further refined as expression (1") below:

$$1.8 < |f_{G1}|/F_A < 2.5 \quad (1''), \text{ and}$$

the imaging optical system is configured to satisfy conditional expression (1").

Moreover, only the upper limit value or only the lower limit value of conditional expression (1) may be refined to be an upper limit value and a lower limit value of conditional expressions (1') and (1").

Here, it is more preferable that the conditional expression (2) is further refined as expression (2') below:

$$1.3 < f_{G2}/F_A < 2.5 \quad (2'), \text{ and}$$

the imaging optical system is configured to satisfy conditional expression (2').

It is even more preferable that the conditional expression (2) is further refined as expression (2") below:

$$1.4 < f_{G2}/F_A < 2 \quad (2''), \text{ and}$$

the imaging optical system is configured to satisfy conditional expression (2").

Moreover, only an upper limit value or a lower limit value of conditional expression (2) may be refined to be an upper limit value and a lower limit value of conditional expression (2') and (2").

When an attempt is made to make bright the F number while achieving the size reduction in an optical system such as in the present invention, the positive refracting power of the rear lens unit having the positive refracting power becomes strong, and a negative spherical aberration occurs. Particularly, the occurrence of aberration at the second lens and the fourth lens of the rear lens unit having a positive refracting power becomes substantial.

Here, it is preferable to let a ratio of a paraxial radius of curvature of a surface on the object side and a paraxial radius of curvature of a surface on the image side of the fourth lens to be close to 1, or in other words, it is preferable to have a shape close to a so-called equi-R. When such an arrangement is made, it is possible to distribute the overall refracting power of the fourth lens substantially evenly between a refracting power of the surface on the object side and a refracting power of the surface on the image side. Accordingly, it is possible to reduce the aberration which occurs at the surface on the object side and the aberration which occurs at the surface on the image side.

In this case, it is preferable that the imaging optical system satisfies the following conditional expression (3):

$$0.5 < |R_{4O}|/R_{4I}| < 1.6 \quad (3)$$

where, $R_{4O}$ denotes a paraxial radius of curvature of a surface on the object side, of the fourth lens, and $R_{4I}$ denotes a paraxial radius of curvature of a surface on an image side, of the fourth lens.

Here, it is more preferable that the conditional expression (3) is further refined as expression (3') below:

$$0.65 < |R_{4O}|/|R_{4I}| < 1.4 \quad (3'), \text{ and}$$

the imaging optical system is configured to satisfy conditional expression (3').

Furthermore, it is even more preferable that the conditional expression (3) is further refined as expression (3") below:

$$0.8 < |R_{4O}|/|R_{4I}| < 1.2 \quad (3''), \text{ and}$$

the imaging optical system is configured to satisfy conditional expression (3").

Moreover, only an upper limit value or a lower limit value in conditional expression (3) may be refined to be an upper limit value and a lower limit value in conditional expressions (3') and (3").

When a surface on an image side of the fourth lens is configured to be an aspheric surface, and when the shape is configured to be such that the positive refracting power becomes weak toward a periphery of the aspheric surface on the image side, it is possible to reduce an occurrence of an aberration, particularly the negative spherical aberration which occurs at the fourth lens.

Furthermore, it is preferable that the refracting power of the aspheric surface on the image side of the fourth lens nearest to an effective portion is negative refracting power. According to such arrangement, since it is possible to cause an occurrence of a positive distortion in an area around the lens, it is possible to correct a negative distortion which occurs at the front lens unit having a negative refracting power.

Furthermore, for reducing the size by shortening the total length of the optical system, it is preferable to increase the refracting power by making small the focal length of the rear lens unit having a positive refracting power. When a thickness of the second lens and the fourth lens having a positive refracting power is made thin, the positive refracting power becomes strong, and it is possible to reduce the size by shortening the total length of the optical system. However, since an edge thickness around the lens becomes thin, processing of the lens becomes difficult. When the lens thickness of the second lens and the fourth lens having a positive refracting power is made thick, the spherical aberration and the coma aberration which occur at the fourth lens becomes substantial.

Therefore, it is preferable to make appropriate a ratio of thickness of the second lens and the fourth lens with respect to the focal length of the overall optical system as shown in expressions (4) and (5):

$$0.55 < d_{L2}/F_A < 1.2 \quad (4)$$

$$0.4 < d_{L4}/F_A < 1.5 \quad (5)$$

where, $F_A$ is a focal length of the overall imaging optical system,
$d_{L2}$ is a thickness on an optical axis of the second lens, and
$d_{L4}$ is a thickness on an optical axis of the fourth lens.

By making an arrangement such that a value is not lower a lower limit in conditional expression (4) and (5), it is advantageous for securing the edge thickness around the lens. Therefore, the processing of lens becomes easy, and a manufacturing efficiency is improved, which is advantageous for reducing the cost. Moreover, by making an arrangement such that a value is not higher than an upper limit value in conditional expression (5), it is advantageous for suppressing the total thickness of the lens and the total length of the optical system from becoming substantial, as well as for suppressing the spherical aberration and the coma aberration.

Here, it is more preferable that the conditional expression (4) is further refined as expression (4') below:

$$0.55 < d_{L2}/F_A < 1.1 \quad (4'), \text{ and}$$

the imaging optical system is configured to satisfy conditional expression (4').

Furthermore, it is even more preferable that the conditional expression (4) is further refined as expression (4") below:

$$0.55 < d_{L2}/F_A < 1 \quad (4''), \text{ and}$$

the imaging optical system is configured to satisfy conditional expression (4").

Moreover, only the upper limit value or the lower limit value in conditional expression (4) may be refined to be an upper limit value and a lower limit value in conditional expressions (4') and (4").

Here, it is more preferable that the conditional expression (5) is further refined as expression (5') below:

$$0.45 < d_{L4}/F_A < 1.25 \quad (5'), \text{ and}$$

the imaging optical system is configured to satisfy conditional expression (5').

Furthermore, it is even more preferable that the conditional expression is further refined as expression (5") below:

$$0.5 < d_{L4}/F_A < 1 \quad (5''), \text{ and}$$

the imaging optical system is configured to satisfy conditional expression (5").

Moreover, only the upper limit value or the lower limit value in conditional expression (5) may be refined to be an upper limit value and a lower limit value in conditional expression (5') and (5").

Furthermore, for correcting a chromatic aberration of magnification of the first lens, it is preferable that the following conditional expression (6) is satisfied:

$$65 < v_{L1} < 100 \quad (6)$$

where, $v_{L1}$ denotes an Abbe's number for the first lens.

At the first lens, the height of the light rays being high, and the chromatic aberration of magnification occurs substantially. Particularly, for securing the back focus, it is remarkable when the negative refracting power of the first lens is made strong. By making an arrangement such that a value is not lower than an upper limit value in conditional expression (6), it is advantageous for suppressing the chromatic aberration of magnification. When a value is higher than an upper limit value in conditional expression (6), there exists no glass which can be used to suit this condition.

It is preferable that the imaging optical system is a system in which, the first lens, the second lens, the third lens, and the fourth lens are made of glass. In the present invention, the imaging optical system might be used as a car-mounted camera. Generally, materials to be used inside the car are assumed to be used under strict conditions of temperature and humidity. Consequently, it is desirable to use a glass having a high stability with respect to a change in the temperature and humidity Moreover, it is preferable that an imaging optical system includes, in order from an object side thereof:

a front lens unit having a negative refracting power, and a rear lens unit having a positive refracting power, the first lens unit having a negative refracting power includes in order from the object side, a first lens having a negative refracting power, the rear lens unit having a positive refracting power includes in order from the object side, a second lens which is a positive lens, a third lens which is a negative lens, and a fourth lens which is a positive lens, an aperture stop which determines an F number is provided between the front lens unit and the rear lens unit, and the F number is 1.8 or less.

Generally, in a wide angle optical system, a retro-focus type which includes, in order from an object side thereof, a front lens unit having a negative refracting power and a rear lens unit having a positive refracting power is used. In a retro-focus optical system having a negative and positive arrangement of lenses, by making strong the refracting power of the rear lens system having a positive refracting power, it is possible to reduce the size of the apparatus, but an occurrence of the spherical aberration and the coma aberration becomes substantial.

Particularly, in a bright optical system having the F number of 1.8 or smaller, since a light beam which passes through becomes large, in an optical system with a small number of lenses, for making favorable aberration characteristics including off-axis rays, it is desirable to minimize an aberration which occurs at each lens. At this time, by distributing a lens unit at a rear side having a positive refracting power by disposing a negative lens between the positive second lens having a positive refracting power and the positive fourth lens having a positive refracting power, the occurrences of the spherical aberration and the coma aberration are reduced.

Furthermore, it is desirable that the imaging optical system is configured to be an imaging optical system in which the first lens is a negative meniscus lens having a convex surface directed toward the object side. In retro-focus optical system having a negative and positive arrangement of lenses, when the refracting power of the front lens unit having a negative refracting power becomes strong, the occurrence of the spherical aberration and the chromatic aberration of magnification becomes substantial, but by letting the first lens to be the negative meniscus lens having the convex surface is directed toward the object side, the occurrence of the chromatic aberration of magnification including the off-axis rays becomes small.

Furthermore, it is preferable that the imaging optical system is an imaging optical system in which each of the second lens, the third lens, and the fourth lens forming the rear lens unit having a positive refracting power is a single lens, and the second lens is a biconvex positive lens, the third lens is a biconcave negative lens, and the fourth lens is a biconvex positive lens.

When the second lens, the third lens, and the fourth lens are single lenses having no cemented surface, the manufacturing becomes easy, and a yield of product manufacturing is improved, and it is possible to reduce a cost of the optical system. Moreover, when the second lens is configured to be the biconvex positive lens, the third lens is configured to be the biconcave negative lens, and the fourth lens is configured to be the biconvex positive lens, regarding the spherical aberration which occurs at each lens, it is possible to distribute the spherical aberration which occurs at the surface on the object side and the spherical aberration which occurs at the surface on the image side, to each surface. Therefore, it is possible to reduce an amount of occurrence of the aberration as a whole.

Exemplary embodiments of an imaging optical system and an image pickup apparatus according to the present invention will be described below in detail by referring to the accompanying diagrams. However, the present invention is not restricted to the embodiments described below.

Figure 1:
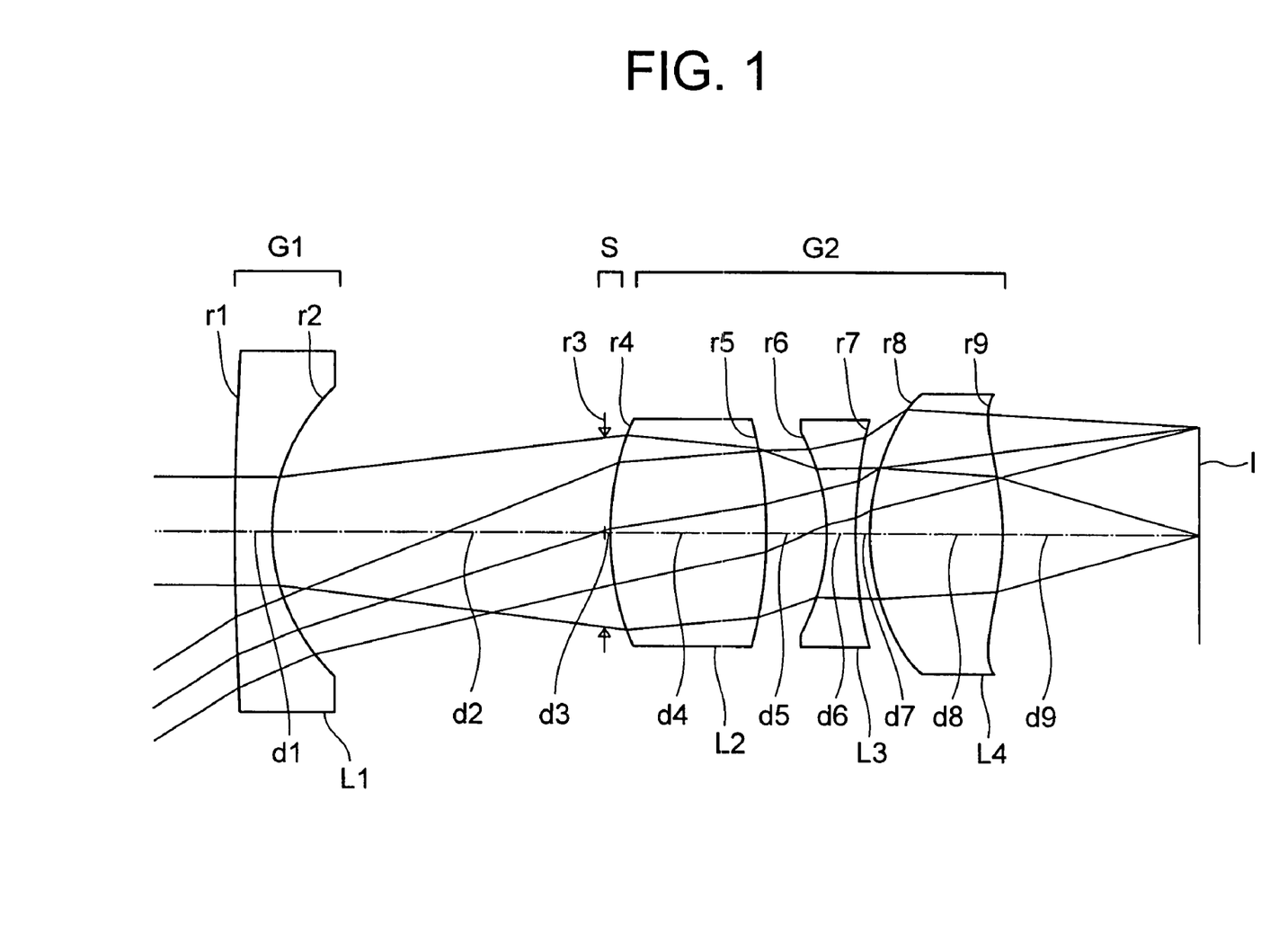
FIG. 1 is a lens cross-sectional view of a first embodiment of an imaging optical system of the present invention.
Figure 2:
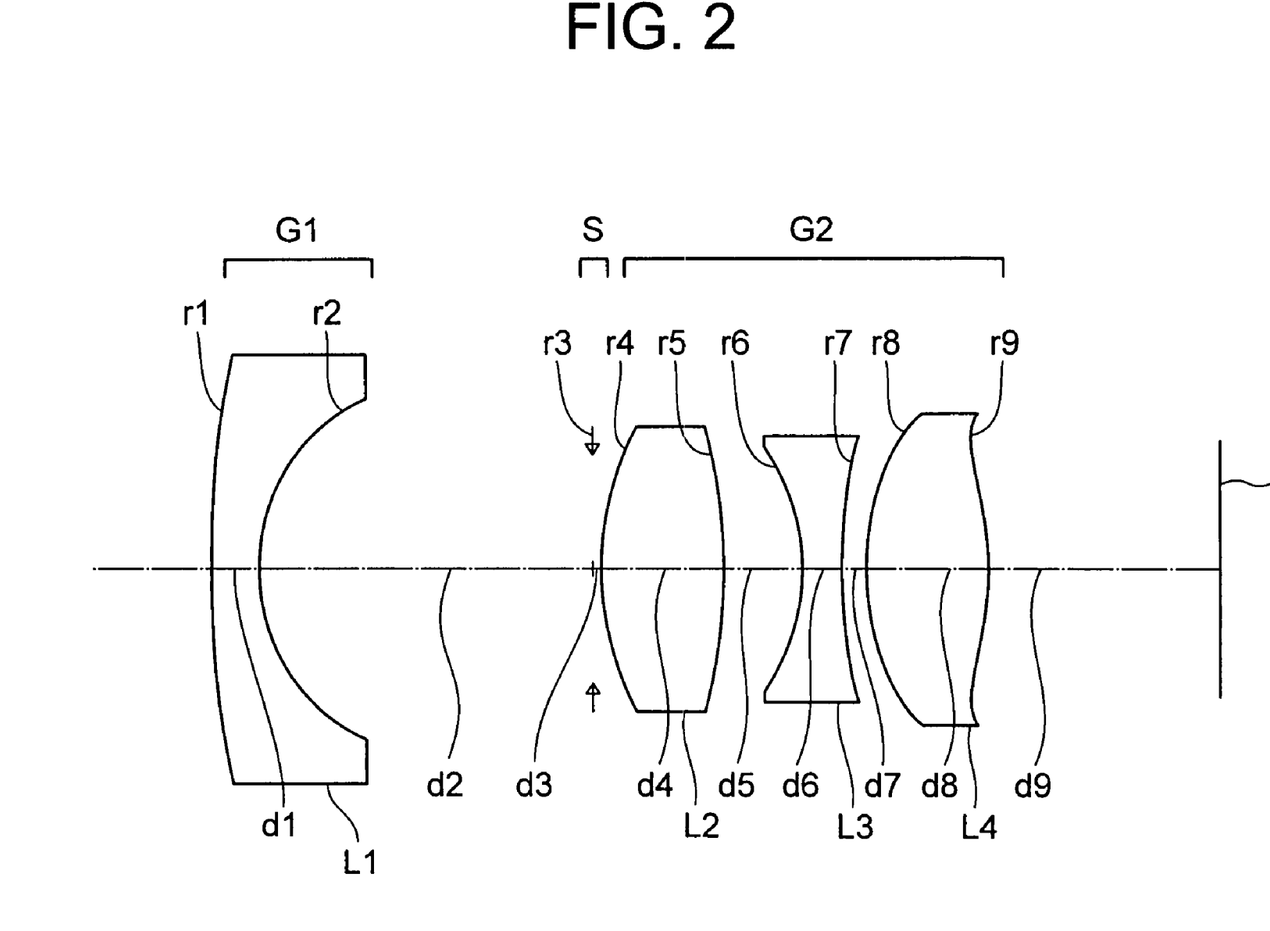
FIG. 2 is a diagram similar to FIG. 1 of a second embodiment of the imaging optical system of the present invention.
Figure 3:
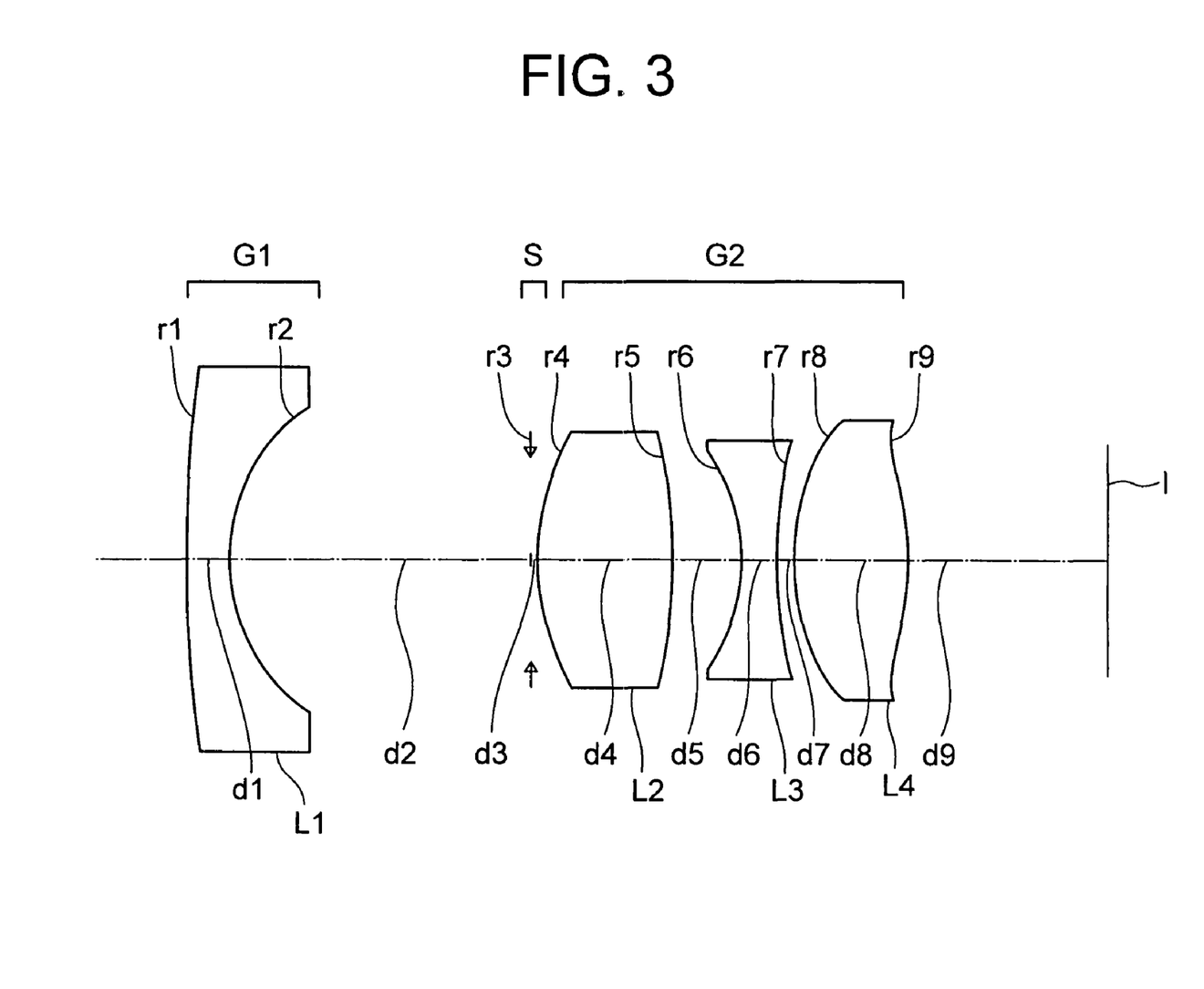
FIG. 3 is diagram similar to FIG. 1 of a third embodiment of the imaging optical system of the present invention.

Embodiments from a first embodiment to a third embodiment of the image optical system of the present invention will be described below. A lens cross-sectional view of the embodiments from the first embodiment to the third embodiment is shown in each of FIG. 1 to FIG. 3. In FIG. 1 to FIG. 3, G1 denotes a front lens unit, S denotes an aperture stop, G2 denotes a rear lens unit, and I denotes an image height. Moreover, a unit of length of each numerical value is mm and a unit of angle of each numerical value is ° (degrees).

First Embodiment

An imaging optical system of the first embodiment, as shown in FIG. 1, includes in order from an object side thereof, a front lens unit G1 having a negative refracting power, an aperture stop S, and a rear lens unit having a positive refracting power. In order from the object side, the front lens unit G1 includes a first lens L1 which is a negative meniscus lens having a convex surface directed toward the object side. The rear lens unit G2 includes a second lens L2 which is a biconvex positive lens, a third lens L3 which is a biconcave negative lens, and a fourth lens L4 which is a biconvex positive lens. Both surfaces of the fourth lens L4 are formed to be aspheric surfaces.

Moreover, specifications of the first embodiment are as follows.
Focal length: 3.960 mm
F no.: 1.80
Half-image angle: 32.38°
Maximum image height: 2.545 mm
Total length of lenses: 20.584 mm
Back focus: 4.144, and
it is a wide angle optical system.

Second Embodiment

An imaging optical system of the second embodiment, as shown in FIG. 2, includes in order from an object side thereof, a front lens unit G1 having a negative refracting power, an aperture stop S, and a rear lens unit G2 having a positive refracting power. In order from the object side, the front lens unit G1 includes a first lens L1 which is a negative meniscus lens having a convex surface directed toward the object side. The rear lens unit G2 includes a second lens L2 which is a biconvex positive lens, a third lens L3 which is a biconcave negative lens, and a fourth lens L4 which is a biconvex positive lens. Both surfaces of the fourth lens L4 are formed to be aspheric surfaces.

Moreover, specifications of the second embodiment are as follows.
Focal length: 3.963 mm
F no.: 1.80
Half-image angle: 32.33°
Maximum image height: 2.338 mm
Total length of lenses: 18.136 mm
Back focus: 4.190 mm, and
it is a wide angle optical system.

Third Embodiment

An imaging lens system of the third embodiment, as shown in FIG. 3, includes in order from an object side thereof, a front lens unit G1 having a negative refracting power, an aperture stop S, and a rear lens unit G2 having a positive refracting power. In order from the object side, the front lens unit G1 includes a first lens L1 which is a negative meniscus lens having a convex surface directed toward the object side. The rear lens unit G2 includes a second lens L2 which is a biconvex positive lens, a third lens L3 which is a biconcave negative lens, and a fourth lens L4 which is a biconvex positive lens. Both surfaces of the fourth lens L4 are formed to be aspheric surfaces.

Moreover, specifications of the third embodiment are as follows.
Focal length: 3.990 mm
F no.: 1.80
Half-image angle: 32.21°
Maximum image height: 2.338 mm
Total length of lenses: 18.467 mm
Back focus: 3.996 mm, and
it is a wide angle optical system.

Numerical data of each embodiment described above is shown below. In each of the tables and figures, r denotes radius of curvature of each lens surface, d denotes a lens thickness and a distance between two lenses, nd denotes a refractive index of each lens for a d-line, and νd denotes an Abbe's number for each lens, er denotes an optical effective radius.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When z is defined to be an optical axis with a direction of traveling of light as a positive (direction), and y is defined to be in a direction orthogonal to the optical axis, a shape of the aspheric surface is described by the following expression:

$$x=(y^2/r)/[1+\{1-(K+1)(y/r)^2\}^{1/2}]+A4y^4+A6y^6+A8y^8+A10y^{10}$$

where, r denotes a paraxial radius of curvature, K denotes a conical coefficient, A4, A6, A8, A10 denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'.

Example 1

Surface data unit mm

| Surface No | r | d | nd | vd | er |
|---|---|---|---|---|---|
| Object plane | ∞ | ∞ | | | |
| 1 | 45.5370 | 0.8406 | 1.48749 | 70.23 | 3.394 |
| 2 | 4.0797 | 7.1198 | | | 2.650 |
| 3(S) | ∞ | 0.1012 | | | 1.977 |
| 4 | 5.9428 | 3.3279 | 1.80400 | 46.57 | 2.156 |
| 5 | −10.2399 | 1.2726 | | | 2.152 |
| 6 | −4.3138 | 0.6348 | 1.84666 | 23.78 | 1.966 |
| 7 | 10.7466 | 0.2896 | | | 2.150 |
| 8* | 4.7716 | 2.8497 | 1.74320 | 49.34 | 2.634 |
| 9* | −5.4980 | 4.1442 | | | 2.545 |
| Image plane | ∞ | | | | |

Aspherical coefficients

8th surface

K = −4.1504,
A4 = 3.3499E−03, A6 = −3.2612E−05, A8 = 2.8070E−05,
A10 = −1.3467E−06
9th surface

K = −6.2470,
A4 = −9.5526E−05, A6 = 2.3083E−04,
A8 = 4.0406E−05

Example 2

| Surface No | r | d | nd | vd | unit mm er |
|---|---|---|---|---|---|
| Object plane | ∞ | ∞ | | | |
| 1 | 18.3459 | 0.8601 | 1.48749 | 70.23 | 3.396 |
| 2 | 3.2108 | 6.0027 | | | 2.567 |
| 3(S) | ∞ | 0.1461 | | | 1.956 |
| 4 | 5.1125 | 2.2195 | 1.80400 | 46.57 | 2.124 |
| 5 | −9.6550 | 1.4054 | | | 2.045 |
| 6 | −3.7008 | 0.7306 | 1.84666 | 23.78 | 1.779 |
| 7 | 10.0662 | 0.4183 | | | 1.966 |
| 8* | 4.6724 | 2.1638 | 1.74320 | 49.34 | 2.400 |
| 9* | −5.3957 | 4.1897 | | | 2.338 |
| Image plane | ∞ | | | | |

Aspherical coefficients

8th surface

K = −1.3345,
A4 = −6.0449E−04, A6 = 4.2027E−04, A8 = 2.4891E−05,
A10 = −1.4913E−06
9th surface

K = −2.1095,
A4 = 2.7982E−03, A6 = 1.0416E−04,
A8 = 8.3124E−05

Example 3

| Surface No | r | d | nd | vd | unit mm er |
|---|---|---|---|---|---|
| 1 | 18.3459 | 0.8601 | 1.48749 | 70.23 | 3.396 |
| Object plane | ∞ | ∞ | | | |
| 1 | 28.7458 | 0.8571 | 1.48749 | 70.23 | 3.396 |
| 2 | 3.4773 | 6.0568 | | | 2.567 |
| 3(S) | ∞ | 0.1333 | | | 1.967 |
| 4 | 4.9030 | 2.6870 | 1.80400 | 46.57 | 2.124 |
| 5 | −11.2499 | 1.3942 | | | 2.045 |
| 6 | −3.6638 | 0.7088 | 1.84666 | 23.78 | 1.779 |
| 7 | 10.1334 | 0.3342 | | | 1.966 |
| 8* | 4.4981 | 2.2999 | 1.74320 | 49.34 | 2.400 |
| 9* | −5.2156 | 3.9960 | | | 2.338 |
| Image plane | ∞ | | | | |

Aspherical coefficients

8th surface

K = −1.0464,
A4 = −1.5236E−03, A6 = 3.9993E−04, A8 = −6.2327E−06,
A10 = 1.3964E−06
9th surface

K = −1.5567,
A4 = 3.3795E−03, A6 = −1.2295E−06,
A8 = 6.0706E−05

Figure 4:
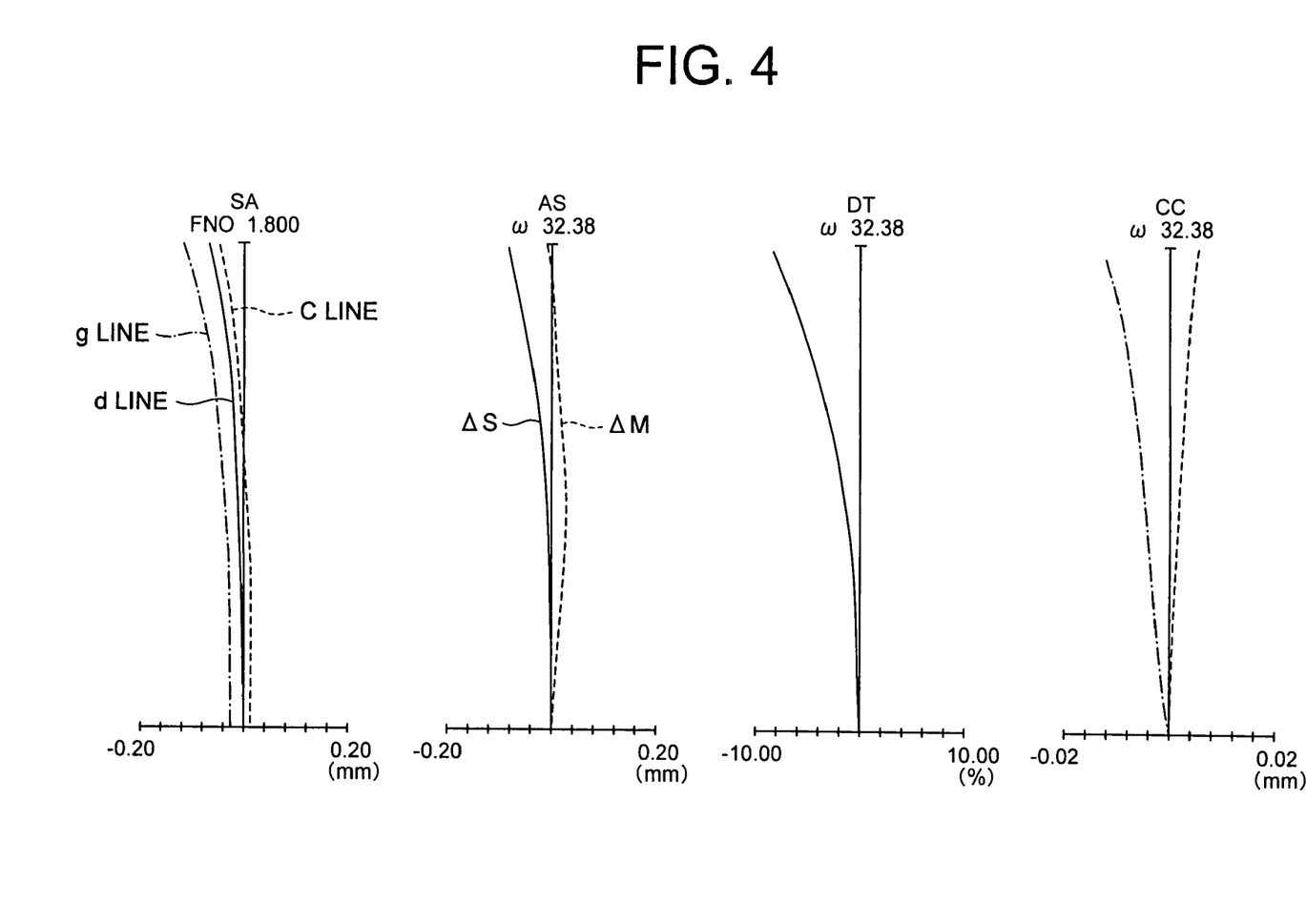
FIG. 4 is an aberration diagram of the first embodiment.
Figure 5:
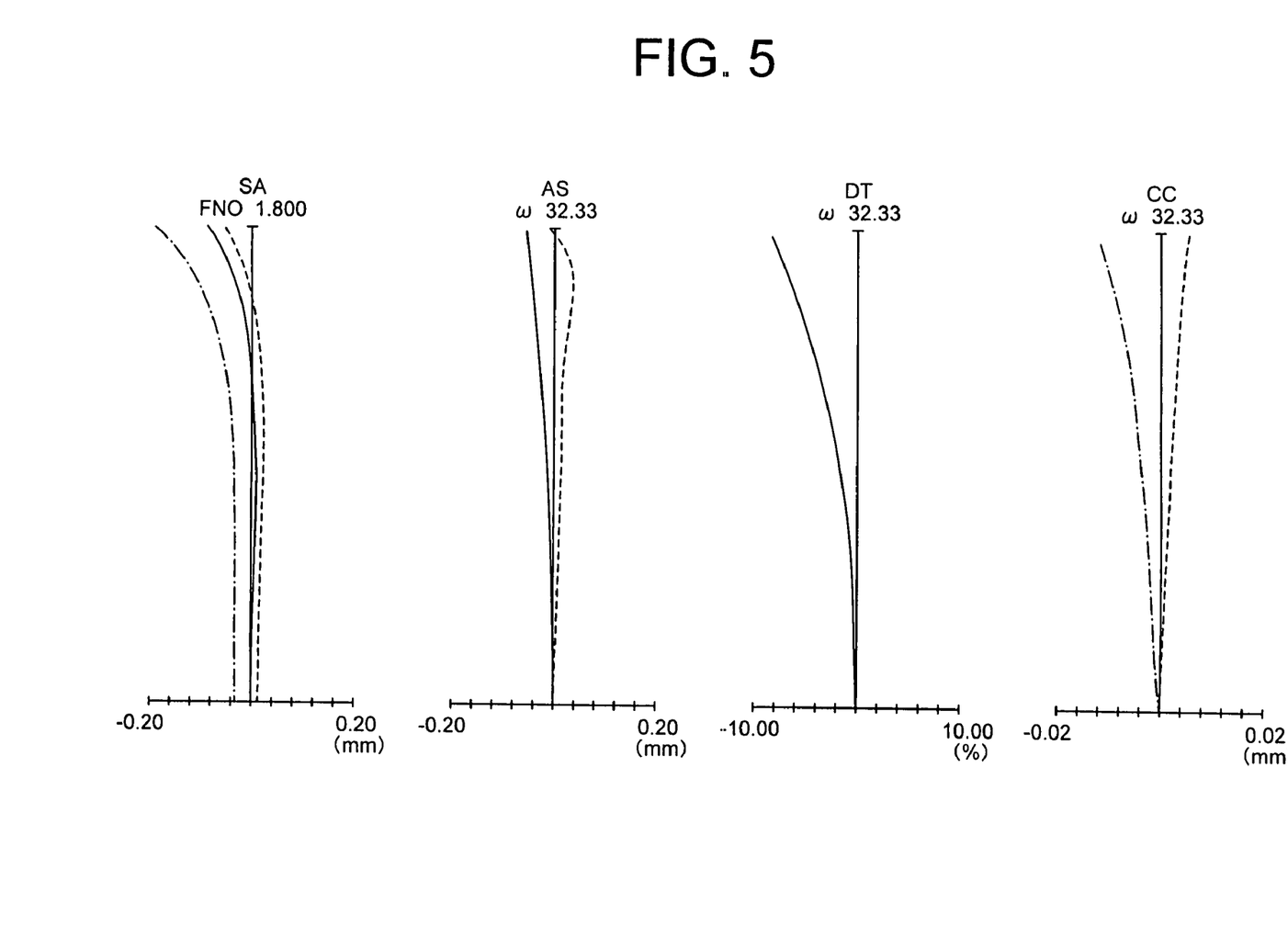
FIG. 5 is an aberration diagram of the second embodiment.
Figure 6:
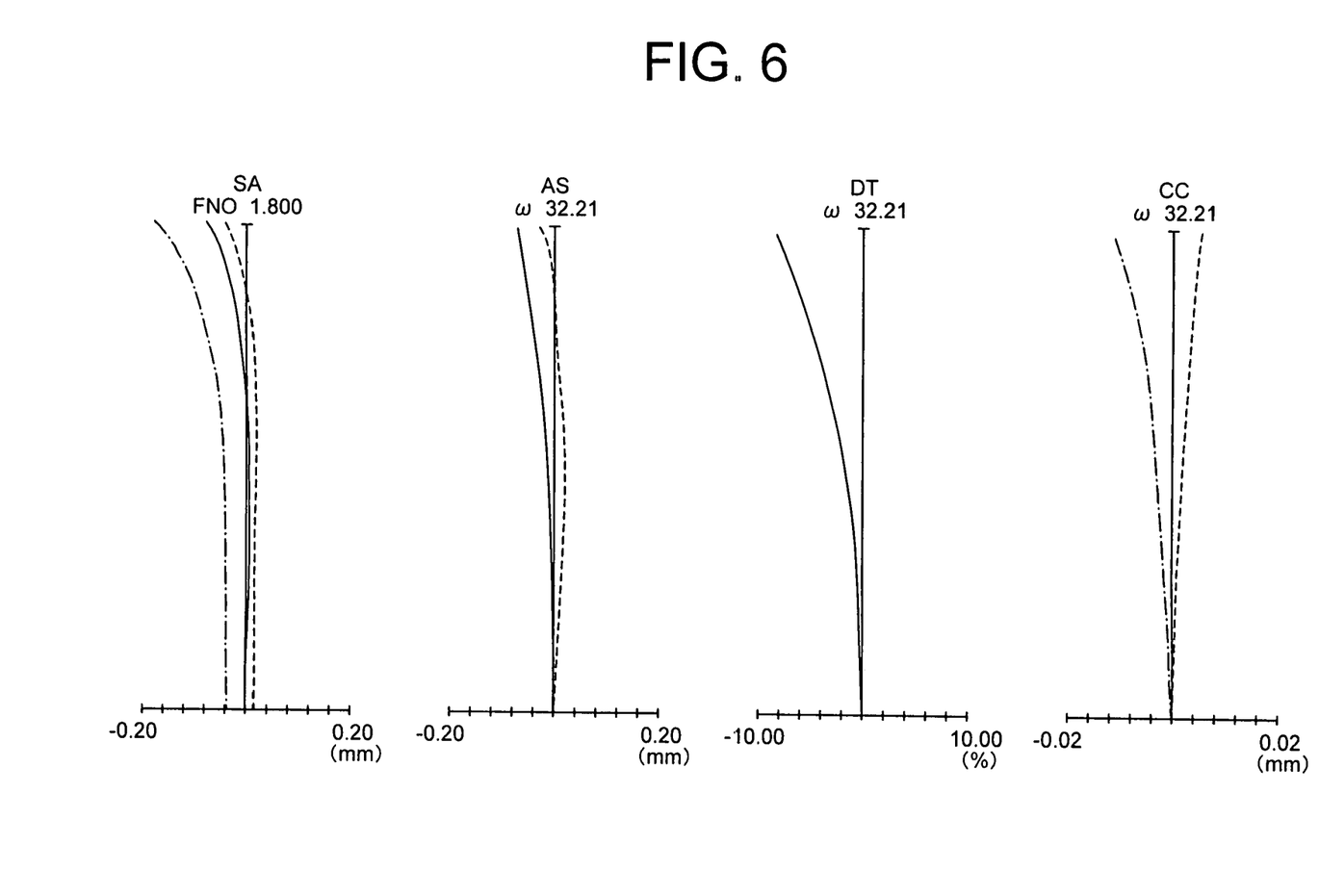
FIG. 6 is an aberration diagram of the third embodiment.

Aberration diagrams of the embodiments from the first embodiment to the third embodiment are shown in FIG. 4 to FIG. 6 respectively. In these aberration diagrams, the spherical aberration (SA), an astigmatism (AS), the distortion (DT), and the chromatic aberration of magnification (CC) are shown. Moreover, in each diagram, 'ω' denotes a half-image angle.

Fourth Embodiment

Figure 7:
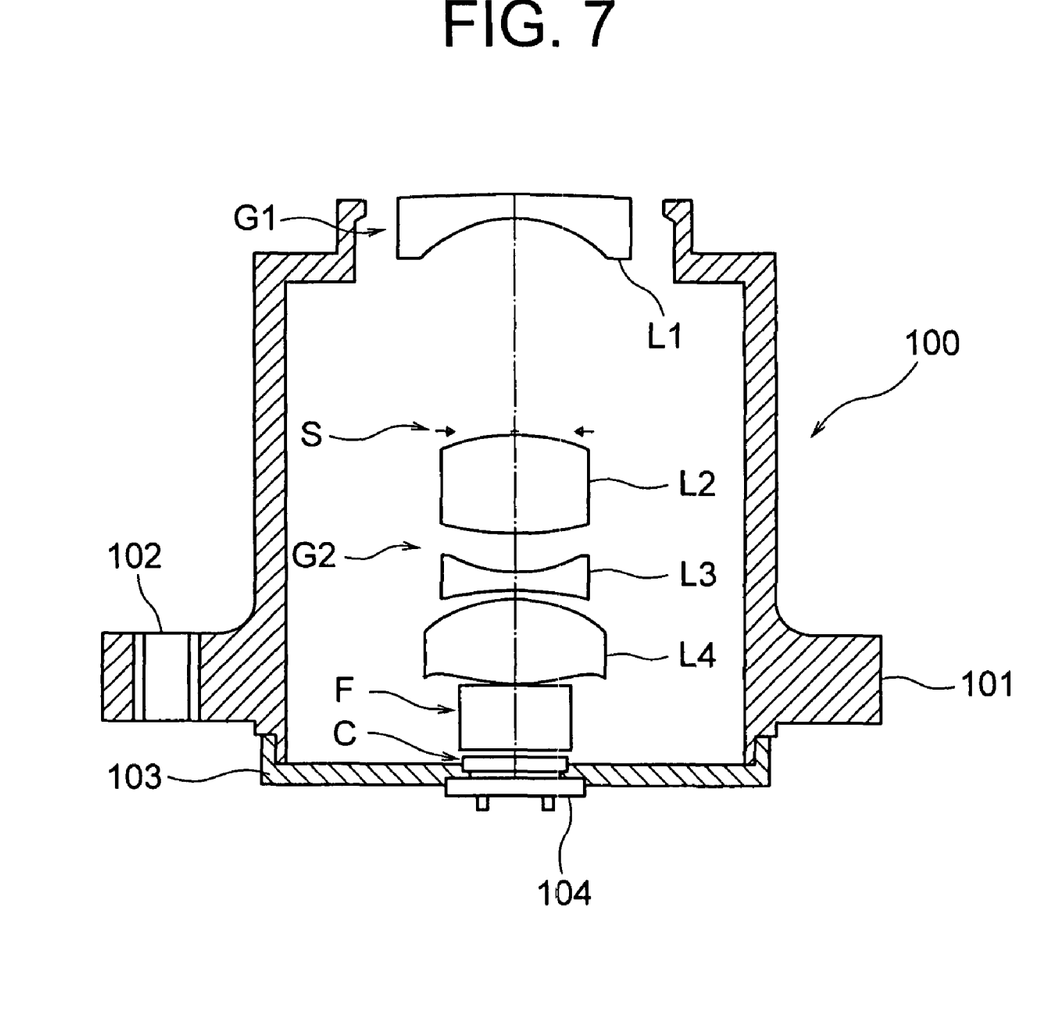
FIG. 7 is a diagram showing a schematic structure of an image pickup apparatus in which the imaging optical system according to the present invention is incorporated.

Next, an image pickup apparatus 100 in which the imaging optical system described above is incorporated will be described below. As the image pickup apparatus 100, a car-mounted camera is applicable, for example. FIG. 7 shows a schematic structure of the image pickup apparatus 100. An object to be imaged is picked up by a CCD 104 which is an image pickup element. Moreover, as an imaging optical system for imaging the object on the CCD 104, the imaging optical system according to the embodiments described above is provided.

F denotes a parallel flat plate which forms a low-pass filter in which, a wavelength region restricting coating which restricts infrared light is applied, and C denotes a parallel flat plate of cover glass of an image pickup element. A multilayered film for restricting a wavelength region may be applied to a surface of the cover glass C. The carbon glass C may be let to have a low pass filter effect.

The imaging optical system is built-in in a main body 101 of the image pickup apparatus 100. Moreover, it is possible to install the image pickup apparatus 100 at a desired position in a car by a screw portion 102. A lower portion of the main body 101 is covered by an image pickup element frame 103 which holds the CCD 104.

By using the image pickup apparatus 100, since the F number of the image pickup optical system is bright, an accuracy of white-line detection at night is improved. Moreover, as an example of an application of the image pickup apparatus 100 as a car-mounted camera, it can be used not only for the white-line detection, but also for monitoring driver's condition, monitoring a traffic lane deviation, and for detecting an obstacle.

Instead of the aperture stop in each of the abovementioned embodiments, a black paint may be applied to a lens surface for setting an optical effective diameter, or the optical effective diameter may be set in a lens frame. Furthermore, the aperture stop may be formed by some other member. As an aperture stop, a direct printing, painting, and adhering a seal on an optical system may be used.

For cutting unnecessary light such as a ghost and a flare, a flare aperture may be disposed apart from the aperture stop. The flare aperture may be disposed at any position such as a position between an object surface and a first lens, between the first lens and a second lens, between a second lens and an aperture stop, between the aperture stop and a third lens, between the third lens and a fourth lens, and between the fourth lens and an image surface. An arrangement may be made to cut the flare light rays by a frame, or some other member may be used. Moreover, as the flare aperture, a direct printing may be carried out, or a paint may be applied, or a seal may be adhered to the optical system. Furthermore, the shape may be any shape such as a circular shape, an elliptical shape, a rectangular shape, a polygon, and an area surrounded by a function curve. Moreover, not only harmful light beam, but also light beam such as a coma flare around a screen may be cut.

The ghost and the flare may be reduced by applying an antireflection coating to each lens. Moreover, a coating which cuts a wavelength may be applied to the lens surfaces and cover glasses.

The focusing may be carried out for a focus adjustment. The focusing may be carried out by drawing out the entire lens system, or by drawing out some of the lenses, or the focusing may be carried over.

Moreover, the shading of brightness in a portion around an image may be reduced by shifting a micro lens of the CCD. For instance, a design of the micro lens of the CCD may be changed according to an angle of incidence of light rays for each image height. Furthermore, an amount of degradation in the portion around an image may be corrected by an image processing.

Moreover, the distortion which occurs in the optical system may be corrected by an image processing. It is also possible to adopt the present invention not only for a car-mounted camera, but also for a camera for monitoring, a digital camera, a digital video camera, and a small-size camera mounted in a cellular phone and a personal computer. In this manner, the present invention can have various modified embodiments which fall within the basic teaching herein set forth.

As it has been described above, the imaging optical system according to the present invention is suitable for an image pickup apparatus, and particularly for a car-mounted camera.

According to the present invention, it is possible to provide an imaging optical system which is advantageous for securing aback focus, securing a telecentricity, and securing an image angle, and also advantageous for securing an image quality even when the F number is reduced. Moreover, it is possible to provide a bright imaging optical system with the small number of lenses forming the system. Furthermore, it is possible to provide an image pickup apparatus which includes such imaging optical system.

What is claimed is:

1. An imaging optical system comprising in order from an object side thereof:

a front lens unit having a negative refracting power;

an aperture stop; and a rear lens unit having a positive refracting power, wherein the front lens unit having a negative refracting power includes in order from the object side, a first lens having a negative refracting power, and the rear lens unit having a positive refracting power includes in order from the object side, a second lens which is a positive lens, a third lens which is a negative lens, and a fourth lens which is a positive lens, and the imaging optical system satisfies the following conditional expressions (1) and (2)

$$1.6 < |f_{G1}|/F_A < 5 \quad (1)$$

$$1.2 < f_{G2}/F_A < 5 \quad (2)$$

where, $F_A$ denotes a focal length of the overall imaging optical system, $f_{G1}$ denotes a focal length of the front lens unit having a negative refracting power, and $f_{G2}$ denotes a focal length of the rear lens unit having a positive refracting power.

2. The imaging optical system according to claim 1, wherein the imaging optical system satisfies the following conditional expressions (4) and (5)

$$0.55 < d_{L2}/F_A < 1.2 \quad (4)$$

$$0.4 < d_{L4}/F_A < 1.5 \quad (5)$$

where, $F_A$ is a focal length of the overall imaging optical system, $d_{L2}$ is a thickness on an optical axis of the second lens, and $d_{L4}$ is a thickness on an optical axis of the fourth lens.

3. The imaging optical system according to claim 1, wherein the imaging optical system satisfies the following conditional expression (6)

$$65 < \nu_{L1} < 100 \quad (6)$$

where, $\nu_{L1}$ denotes an Abbe's number for the first lens.

4. The imaging optical system according to claim 1, wherein the first lens, the second lens, the third lens, and the fourth lens are made of glass.

5. The imaging optical system according to claim 1, wherein the first lens is a negative meniscus lens having a convex surface directed toward the object side.

6. The imaging optical system according to claim 1, wherein
   each of the second lens, the third lens, and the fourth lens constituting the rear lens unit having a positive refracting power is a single lens, and
   the second lens is a biconvex lens, the third lens is a biconcave lens, and the fourth lens is a biconvex lens.

7. An image pickup apparatus which picks up an image of an object by an image pickup element, comprising:
   an imaging optical system described in claim 1, as an imaging optical system for imaging the object on the image pickup element.

8. The imaging optical system according to claim 1, wherein
   a surface on an image side of the fourth lens is an aspheric surface, and
   toward a periphery of the aspheric surface on the image side, the aspheric surface has a shape such that the positive refracting power becomes weak, and
   the fourth lens satisfies the following conditional expression (3)

$$0.5 < |R_{4O}|/|R_{4I}| < 1.6 \tag{3}$$

where,
   $R_{4O}$ denotes a paraxial radius of curvature of a surface on the object side, of the fourth lens, and
   $R_{4I}$ denotes a paraxial radius of curvature of a surface on an image side, of the fourth lens.

9. The imaging optical system according to claim 8, wherein a surface on the image side of the fourth lens has a shape such that it has a negative refracting power at an area nearest to an effective aperture.

10. An imaging optical system comprising in order from an object side thereof:
    a front lens unit having a negative refracting power; and
    a rear lens unit having a positive refracting power, wherein
    the first lens unit having a negative refracting power includes in order from the object side, a first lens having a negative refracting power, and
    the rear lens unit having a positive refracting power includes in order from the object side, a second lens which is a positive lens, a third lens which is a negative lens, and a fourth lens which is a positive lens, and
    an aperture stop which determines an F number is provided between the front lens unit and the rear lens unit, and
    the F number is 1.8 or less.

11. The imaging optical system according to claim 10, wherein the first lens is a negative meniscus lens having a convex surface directed toward the object side.

12. The imaging optical system according to claim 10, wherein
    each of the second lens, the third lens, and the fourth lens constituting the rear lens unit having a positive refracting power is a single lens, and
    the second lens is a biconvex lens, the third lens is a biconcave lens, and the fourth lens is a biconvex lens.

13. An image pickup apparatus which picks up an image of an object by an image pickup element, comprising:
    an imaging optical system described in claim 10, as an imaging optical system for imaging the object on the image pickup element.

* * * * *